United States Patent [19]

Lagoni

[11] Patent Number: 5,200,829
[45] Date of Patent: Apr. 6, 1993

[54] CONTRAST BEAM CURRENT LIMITING ARRANGEMENT WITH SECONDARY BRIGHTNESS BEAM CURRENT LIMITING PROVISIONS

[75] Inventor: William A. Lagoni, Indianapolis, Ind.

[73] Assignee: Thomson Consumer Electronics, Inc., Indianapolis, Ind.

[21] Appl. No.: 807,468

[22] Filed: Dec. 16, 1991

[51] Int. Cl.⁵ .................. H04N 5/68; H04N 9/16; H04N 5/57
[52] U.S. Cl. ................... 358/243; 358/74; 358/168; 358/169
[58] Field of Search ............... 358/243, 74, 168, 169

[56] References Cited

U.S. PATENT DOCUMENTS

| | | | |
|---|---|---|---|
| 3,873,767 | 3/1975 | Okada et al. | 358/243 |
| 4,081,838 | 3/1978 | Wheeler | 358/169 |
| 4,095,518 | 6/1978 | Tuma et al. | 358/243 |
| 4,126,884 | 11/1978 | Shanley, II | 358/21 |
| 4,137,552 | 1/1979 | Serafini | 358/243 |
| 4,167,025 | 9/1979 | Willis | 358/243 |
| 4,253,110 | 2/1981 | Harwood et al. | 358/74 |
| 4,587,554 | 5/1986 | Tamura et al. | 358/74 |
| 4,599,643 | 7/1986 | Harlan | 358/74 |
| 4,633,320 | 12/1986 | Willis | 358/243 |
| 4,689,668 | 8/1987 | Sutherland, II et al. | 358/243 |
| 4,980,756 | 12/1990 | Lagoni | 358/39 |
| 4,982,287 | 1/1991 | Lagoni | 358/168 |

OTHER PUBLICATIONS

"CTC 140 Color TV Chassis Technical Training Manual" copyright 1987 General Electric Company, available from Thomson Consumer Electronics Technical Training, Indianapolis, IN. p. 71.

A portion of the schematic for JVC model AV-37G-2/AV-33G2 television receiver.

*Primary Examiner*—John K. Peng
*Attorney, Agent, or Firm*—Joseph S. Tripoli; Peter M. Emanuel

[57] ABSTRACT

A television system includes a picture tube beam current limiting arrangement which operates to reduce image contrast without affecting image brightness when the beam current exceeds a first threshold. However, if the user brightness control setting exceed the nominal (midrange) brightness control level, the image brightness is reduced when the beam current exceeds a second threshold which may be equal to or greater than the first. The image brightness is reduced only until the image brightness is within a small margin of the nominal image brightness level. Any further beam current limiting, for example to account for abnormal operating conditions of the television system are accomplished by further brightness reductions.

11 Claims, 6 Drawing Sheets

CONTRAST BEAM CURRENT LIMITING ARRANGEMENT WITH SECONDARY BRIGHTNESS BEAM CURRENT LIMITING PROVISIONS

FIELD OF THE INVENTION

The present invention concerns a beam current limiting arrangement such as may be employed in a television receiver or monitor.

BACKGROUND OF THE INVENTION

Most television systems, such as television receivers and monitors, which include a picture tube as a display device, also include a picture tube beam current limiting (BCL) arrangement, sometimes also known as an automatic beam limiting (ABL) arrangement. A BCL arrangement operates to prevent excessive beam currents which tend to cause spot defocussing or "blooming" and which may also damage the picture tube under extreme conditions. Typically, a BCL arrangement senses the average beam current drawn by the picture tube by sensing the "resupply" current drawn from a high voltage power supply for the picture tube and develops a BCL control signal representing the magnitude of the beam current. The BCL control signal is coupled in a feedback manner to one or both of contrast and brightness sections of the television system so as to reduce the beam current should the sensed beam current exceed a predetermined threshold. The contrast section controls the gain of the video channel coupled to the picture tube and therefore the peak-to-peak amplitude of video signals coupled to the picture tube. The brightness section controls the black level of video signals coupled to the picture tube.

Most BCL arrangements operate in a sequential manner to by reducing the contrast of reproduced images before reducing their brightness because contrast changes are subjectively less noticeably by viewers than are brightness changes. Nevertheless, noticeable brightness variations may be produced in otherwise well composed images. Such BCL induced brightness variations are especially pronounced in television systems, such as large screen and projection systems, which employ relatively high gain video channels in order to increase the average picture light output.

SUMMARY OF THE INVENTION

An aspect of the invention concerns the recognition that it is not desirable for a BCL arrangement to reduce the brightness of reproduced images under normal operating conditions. However, another aspect of the invention concerns the recognition that while it is possible to accomplish beam current limiting by reducing only the contrast of reproduced images at or near a nominal (midrange) brightness level, such contrast-only beam current limiting may be unacceptable and ineffective for images with greater than nominal brightness level. Thus, if the user brightness setting is greater than that corresponding to the nominal brightness level, and only contrast beam current limiting is used, image contrast can be reduced to the minimum level without reducing the beam current to an acceptable level.

Another aspect of the invention concerns a BCL arrangement in which substantially the full range of contrast reduction is utilized without a reduction of brightness if the user brightness setting is at or near the nominal level. However, the BCL arrangement senses the level of the user brightness setting and reduces the brightness setting to within a margin of the nominal level if the user brightness setting is unusually high. Any additional beam current reduction is accomplished by contrast reduction.

These and other aspects of the invention will be described with respect to the accompanying Drawing.

BRIEF DESCRIPTION OF THE DRAWING

In the Drawing.

Exemplary component, voltage and current values are indicated in FIGS. 1-6. The values of resistors are in ohms unless otherwise indicated. The letter "K" indicates kilohms and the letter "M" indicates megohms. The values of capacitors are in microfarads. The values of voltages are in volts (V) and the values of currents are in microamperes.

DETAILED DESCRIPTION OF THE DRAWING

Figure 1:
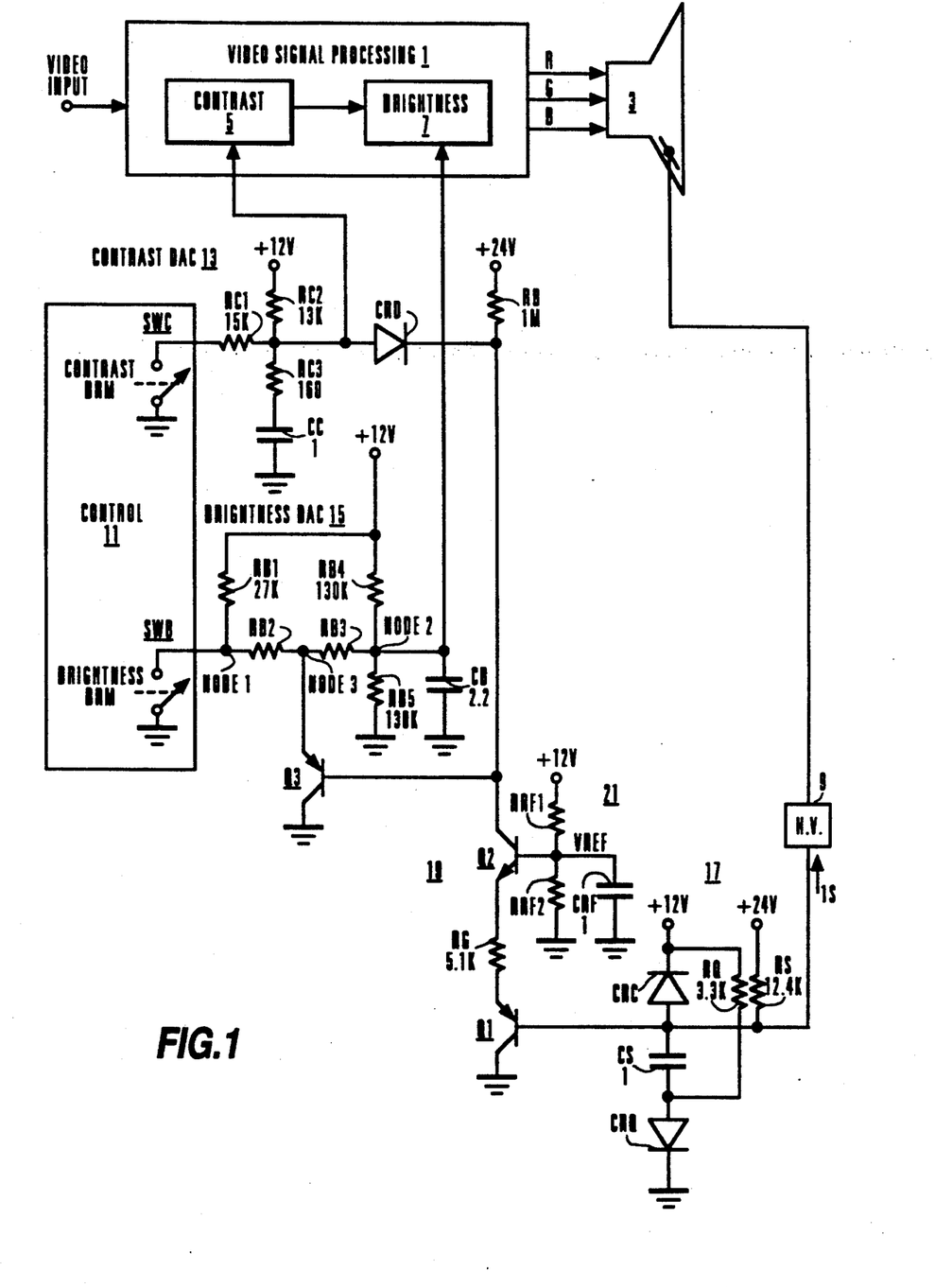
FIG. 1 shows, partially in block diagram form and partially in schematic diagram form, a television system including a beam current limiting arrangement constructed in accordance with an aspect of the present invention.

The television system shown in FIG. 1 includes a video signal processing unit 1 for processing luminance and chrominance components of a composite video input signal to produce red, green and blue (R, G and B) output signals suitable for driving a picture tube 3. Video signal processing unit 1 includes a contrast section 5 for controlling the peak-to-peak amplitude of the R, G and B signals coupled to picture tube 3 and a brightness section 7 for controlling the black level of the R, G and B signals. Contrast section 5 and brightness section 7 may be included in a luminance signal processing channel (not shown) such as is incorporated in a TA8680 television signal processing integrated circuit available from Toshiba Corporation. Alternatively, pairs of contrast and brightness sections corresponding to contrast section 5 and brightness section 7 may be included in respective ones of red, green and blue video signal processing channels such as are incorporated in a TA7730 video signal processing integrated circuit also available from Toshiba Corporation. A high voltage power supply 9 provides a high operating voltage for picture tube 3 in response to horizontal deflection signals generated by a deflection section (not shown). The remaining portion of the television system shown in FIG. 1 includes contrast and brightness control sections and a beam current limiting (BCL) arrangement constructed in accordance with the present invention.

Various portions of the television system are controlled by a control unit 11 comprising a microprocessor operating in accordance with a stored program and in response to user initiated command signal entered, for example, by means of a remote control unit (not shown).

Control unit 11 generates a pulse signal encoded, for example, in binary rate multiplier (BRM) form, to represent the user's contrast preference. The contrast BRM pulse signal controls an electronic switch SWC comprising a part of an digital-to-analog converter (DAC) 13 for developing a user responsive analog contrast control voltage which is coupled to contrast section 5. The contrast of a reproduced image is directly related to the magnitude of the user responsive analog contrast control voltage. Thus, increases of the magnitude of the analog contrast control voltage result in increases of image contrast and decreases of the magnitude of the analog contrast control voltage result in decreases of image image.

Switch SWC is connected in series with resistors RC1 and RC2 to a source of positive supply voltage (+12 v). As switch SWC is opened and closed in response to the contrast BRM signal, a level shifted version of the contrast BRM pulse signal is developed at the junction of resistors RC1 and RC2. The level shifted pulse signal is coupled via a low valued resistor RC3 to a filter capacitor CC where it is low pass filtered to develop the user responsive analog contrast control voltage.

Control unit 11 also generates a BRM encoded pulse signal representing the user's brightness preference. The brightness BRM pulse signal controls an electronic switch SWB comprising a part of an digital-to-analog converter (DAC) 15 for developing a user responsive analog brightness control voltage which is coupled to brightness section 7. The brightness of a reproduced image is directly related to the magnitude of the user responsive analog brightness control voltage. Thus, increases of the magnitude of the analog brightness control voltage result in increases of image brightness and decreases of the magnitude of the analog brightness control voltage result in decreases of image brightness.

Switch SWB is connected in series with a resistor RB1 to a source of positive supply voltage (+12 v). As switch SWB is opened and closed in response to the brightness BRM signal, a level shifted version of the brightness BRM pulse signal is developed at the junction of resistor RB1 and switch SWB. The level shifted pulse signal is filtered by a low pass filter comprising series-connected resistors RB2 and RB3 and a capacitor CB to develop the user responsive analog brightness control voltage. The low pass filter also comprises a voltage divider including resistors RB4 and RB5 connected in series between a source of positive supply voltage (+12 v) and ground. A voltage corresponding to the nominal brightness level is developed at the junction of resistors RB4 and RB5 and is coupled to the junction of resistor RB3 and capacitor CB.

A BCL arrangement includes a circuit 17 for sensing the beam current drawn by picture tube 3 in response to the R, G and B signals by sensing the current (IS) drawn by high voltage power supply 9 from a source of positive supply voltage (+24 v) through a resistor RS. Current IS is known as the resupply current because it is drawn by high voltage supply 9 during horizontal retrace intervals to replenish (resupply) the current drawn from it by picture tube 3 during horizontal trace intervals. The voltage developed across resistor RS is proportional to the the magnitude of resupply current IS and is filtered by a filter capacitor CS. The voltage developed across capacitor RS is therefore normally proportional to the average value of resupply current IS and therefore the average value of the beam current drawn by picture tube 3.

A diode CRQ is normally forward biased and therefore conductive by virtue of the connection of its anode to a source of positive supply voltage (+12 v) through a resistor RQ. When diode CRQ is conductive, it connects filter capacitor CP to ground so that filter capacitor CP serves to filter the voltage developed across resistor RS as described before. Diode CRQ is however reverse biased and therefore rendered nonconductive in response to instantaneous surges of the resupply current. When diode CRQ is rendered nonconductive, filter capacitor CS is decoupled from ground and allows the voltage developed across resistor RS to reflect the instantaneous surges of the resupply current. Such a "quick disconnection" arrangement is the subject matter of U.S. Pat. No. 4,167,025, entitled "Automatic Peak Beam Current Limiter" issued to D. H. Willis on Sep. 4, 1979.

The beam current representative voltage developed across resistor RS is coupled via an emitter-follower configured PNP transistor Q1 to a threshold comparator 19 comprising a common-base configured NPN transistor Q2. Threshold comparator 19 also includes a resistor RG connected between the emitters of transistors Q1 and Q2 and a reference voltage (VREF) determining voltage divider 21, including resistors RRF1 and RRF2 and a filter capacitor CRF. Reference voltage VREF is coupled to the base of transistor Q2. A clamping diode CRC connected between the base of transistor Q1 and a source of positive supply voltage (+12 v) prevents the voltage developed at the base from exceeding a level slightly (0.7 v) greater than the supply voltage in order to prevent the reverse voltage breakdown of transistor Q1 and/or transistor Q2. The collector of transistor Q2 is coupled to a source of positive supply voltage (+24 v) through a resistor RB. A BCL control voltage representing the magnitude of the beam current is developed at the collector of transistor Q2.

The BCL control voltage developed at the collector of transistor Q2 is coupled to the output of contrast DAC 13 through a diode CRD. The BCL control voltage is also coupled to an emitter-follower configured PNP transistor Q3 associated with brightness DAC 15. Diode CRD isolates contrast DAC 13 from brightness DAC 15. Emitter-follower configured transistor Q3 buffers the collector of transistor Q2 so that the gain of comparator 19 comprising transistor Q2 is independent of the impedance resented by brightness DAC 15. The gain of comparator 19 is determined by the impedance presented to the collector of transistor Q2 by contrast DAC 13 and by the value of resistor RG connected between the emitters of transistors Q1 and Q2. Transistor Q3, in conjunction with resistors RB2, RB3, RB4 and RB5, also serves as a comparator for comparing the user's brightness setting with the BCL control voltage. It is this comparison which determines when brightness BCL limiting begins, and, more particularly ensures that brightness BCL normally only occurs if the user's brightness setting is above the nominal (midrange) brightness control level.

In operation, when the magnitude of beam current drawn by picture tube 3 is very low, the base voltage of transistor Q1 is clamped to approximately +12.7 volts by conductive diode CRC. At a somewhat higher magnitude of beam current, diode CRC is rendered nonconductive allowing the base voltage of transistor Q1 to change. The magnitude of voltage developed across resistor RS, through which resupply current IS flows, is directly related to the magnitude of the beam current. Therefore, the magnitude of the voltage developed at the base of transistor Q1 is inversely related to the magnitude of the beam current so that as the beam current continues to increase, the inversely related base voltage of transistor Q1 decreases. The emitter voltage of transistor Q1 follows the base voltage of transistor Q1. However, the latter voltage is not coupled to the collector of transistor Q2, and beam current limiting does not occur, until transistor is Q2 is rendered conductive. Transistor Q2 is rendered conductive when the emitter voltage of transistor Q2 reaches a voltage slightly lower (0.7 v) than the reference voltage VREF. The threshold at which beam current limiting begins is quantitatively established by the value of reference voltage VREF and the value of resistor RS.

Once the beam current limiting threshold is reached, the magnitude of the BCL control voltage developed at the collector of transistor Q2 decreases. This immediately causes the magnitude of the contrast control voltage coupled to contrast section 5 to decrease. However, the brightness control voltage coupled to brightness section does not decrease until comparator transistor Q3 is rendered conductive. Transistor Q3 is rendered conductive when two criteria are met:

1. the average value of the pulse signal developed at the junction of resistor RB1 and switch SWB (node 1) must exceed the voltage developed at the junction of resistors RB4 and RB5 (node 2); and
2. the BCL control voltage developed at the collector of transistor Q2 must fall below the voltage developed at the junction of resistors RB2 and RB3 (node 3).

If, as earlier noted, the values of resistors RB4 and RB5 are selected so that the voltage developed at their junction (node 2) corresponds to the nominal brightness control level, the first of the above criteria ensures that brightness beam current limiting will not occur unless the the user brightness control setting is greater than the nominal brightness control level.

The brightness comparator arrangement including transistor Q3 and resistors RB2, RB3, RB4 and RB5 operates in the following way. When the average value of the pulse signal developed at node 1 equals the voltage developed at node 2, no current flows between nodes 1 and 2 in either direction. As a result, the voltage developed at node 3 is equal to the voltage developed at node 1, i.e., the nominal brightness control level. When the average value of the pulse signal developed at node 1 is less than the voltage developed at node 2, the voltage developed at node 3 is less than the nominal brightness control level. When the average value of the pulse signal developed at node 1 is greater than the voltage developed at node 2, the voltage developed at node 3 is greater than the nominal brightness control level. As a result, brightness beam current limiting does not occur unless the user has set the brightness control level higher than the nominal brightness control level.

Once transistor Q3 is conductive, the brightness control voltage decreases in response to the decreasing BCL control voltage developed at the collector of transistor Q2. During this time, the brightness control voltage is determined by the voltage developed at the emitter of transistor Q3 (the BCL control voltage less the base to emitter voltage drop of transistor Q3), the value of resistor RB3 and the Thevenin equivalent circuit of the voltage divider comprising resistors RB4 and and RB5 (a voltage source supplying a voltage equal to the voltage developed at node 2 and a source resistance equal to the parallel combination of resistors RB4 and RB5).

Transistor Q2 will eventually saturate at a relatively high level of beam current. After this occurs, the BCL control voltage developed at the collector of transistor Q2 will be clamped to the reference voltage VREF coupled to the base of transistor Q2 less the base to collector voltage drop. As a result, the contrast control voltage will be clamped to approximately the reference voltage VREF, noting that the voltage drop of diode CRD approximately equals the base to collector voltage drop of transistor Q2. The brightness control voltage will be clamped to a voltage determined by reference voltage VREF, the value of resistor RB3 and the Thevenin equivalent circuit of the voltage divider comprising resistors RB4 and and RB5, as noted above.

FIGS. 2-5 show the open loop contrast and brightness control characteristics of the BCL arrangement shown in FIG. 1 as a function of beam current. These characteristics correspond to the values of resistors (with the exception of resistors RB2 and RB3) shown in FIG. 1 and are appropriate for controlling the contrast and brightness sections of the Toshiba TA7730 video signal processing IC referred to above. In FIGS. 2-5, the contrast control characteristic for minimum, nominal and maximum user contrast control settings are shown. It is noted that with respect to the contrast control characteristics, that once the control voltage reaches the minimum gain value of contrast section 5, image contrast is not reduced further although the contrast control voltage continues to decrease. The brightness control characteristics for only the nominal and maximum user brightness settings are shown because brightness beam current limiting does not occur unless the user brightness setting is at or greater than the nominal user brightness setting.

Figure 2:
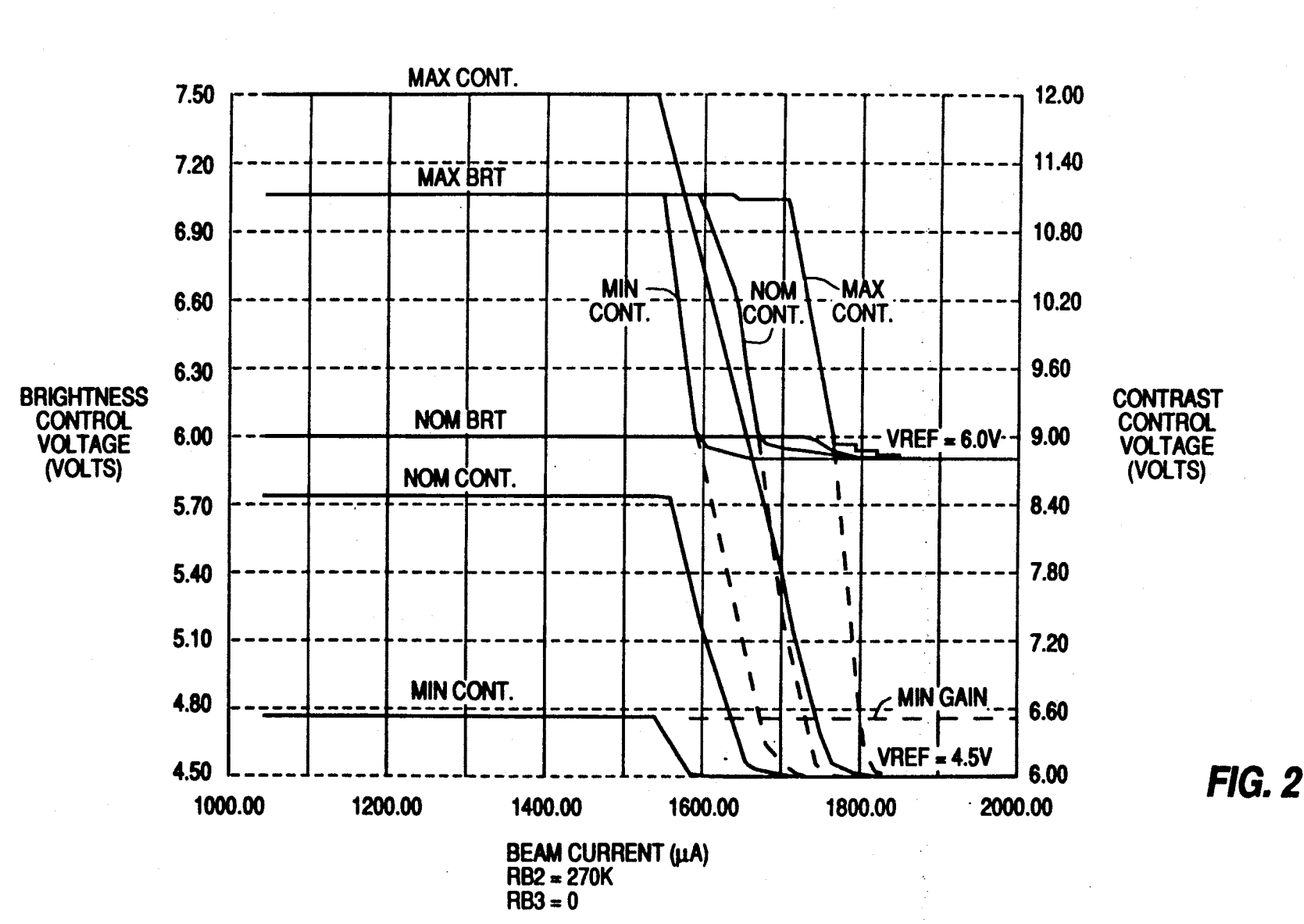
FIGS. 2-5 show characteristics helpful in understanding the operation of the BCL arrangement shown in FIG. 1.
Figure 3:
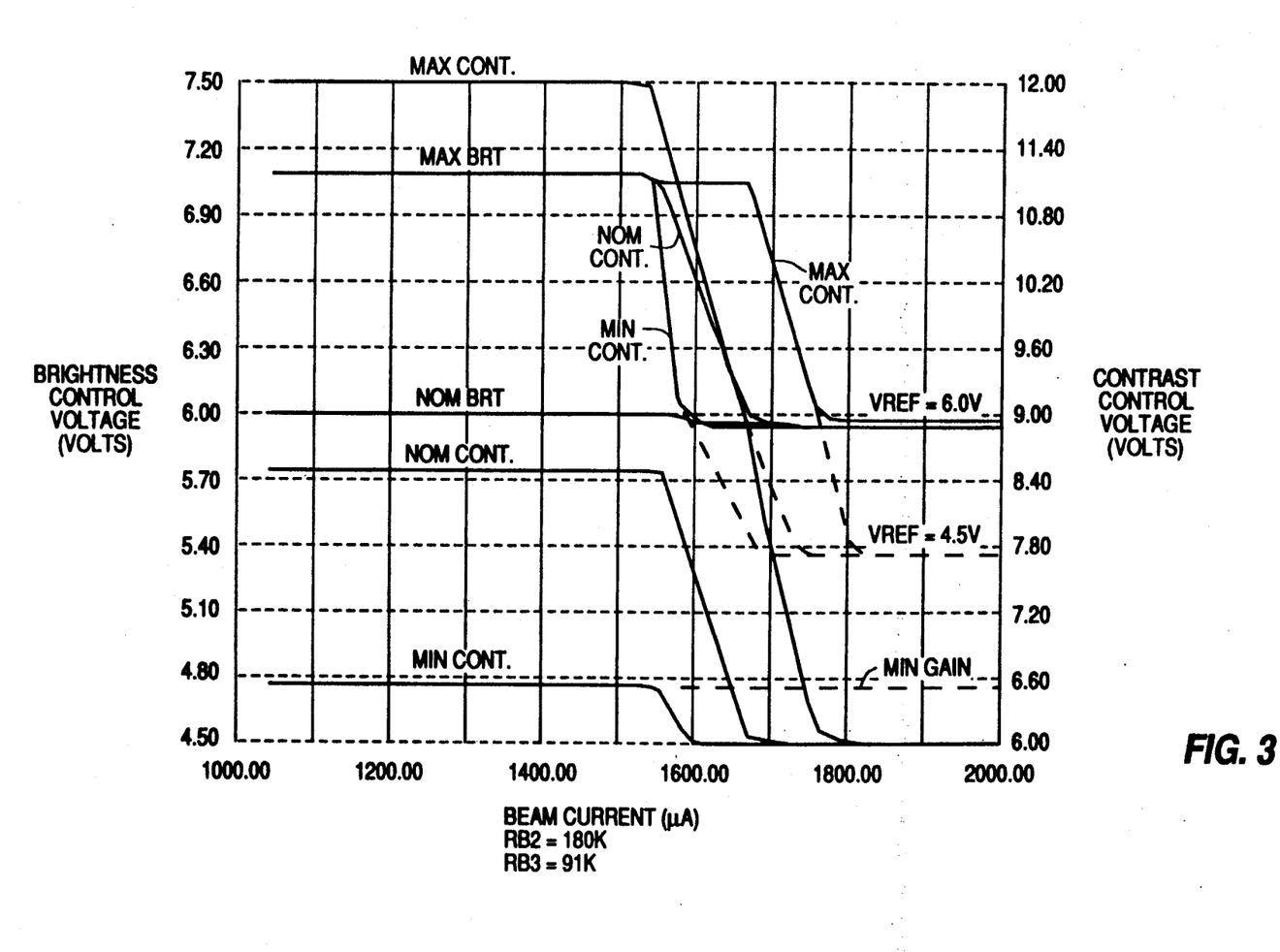
Figure 4:
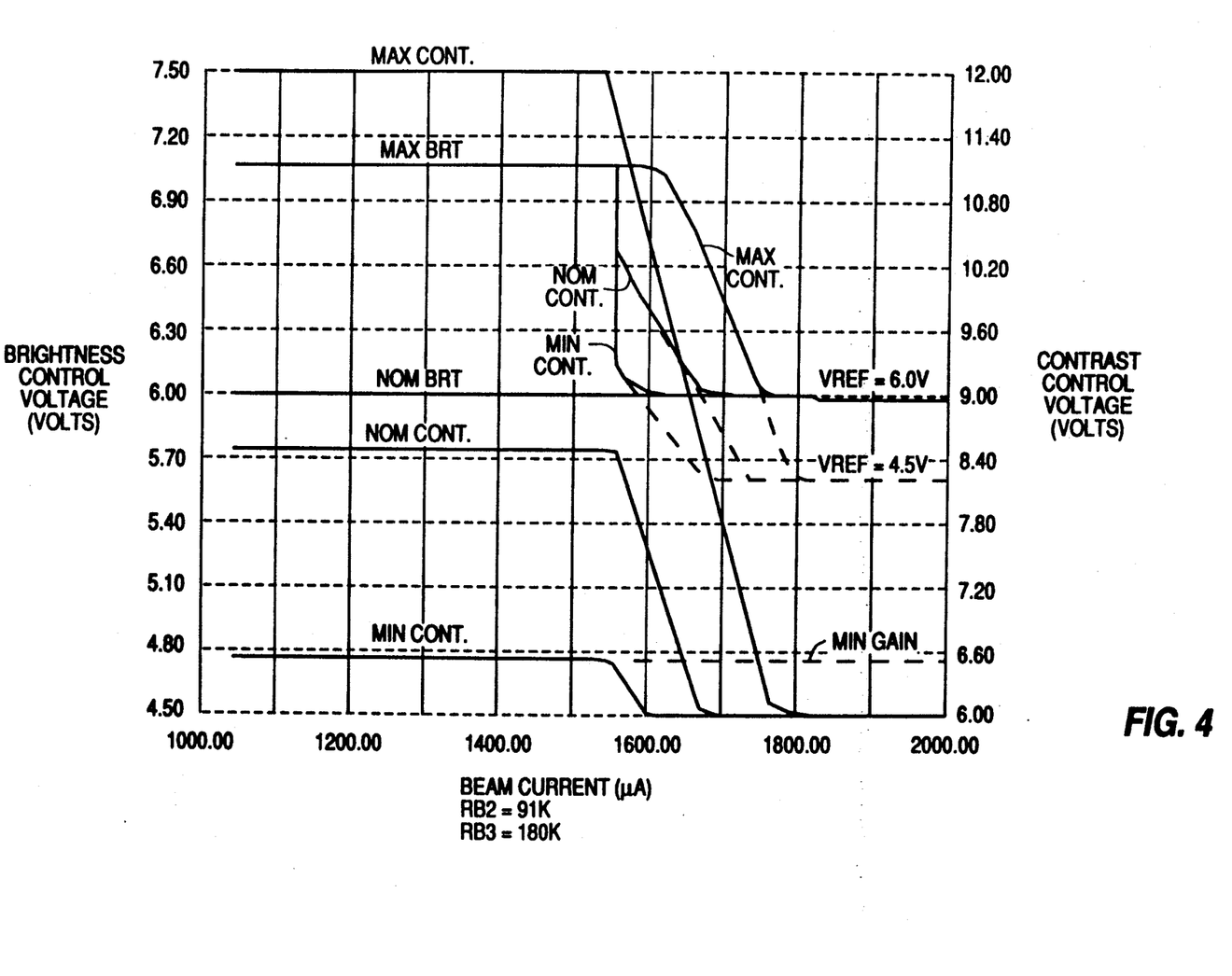
Figure 5:
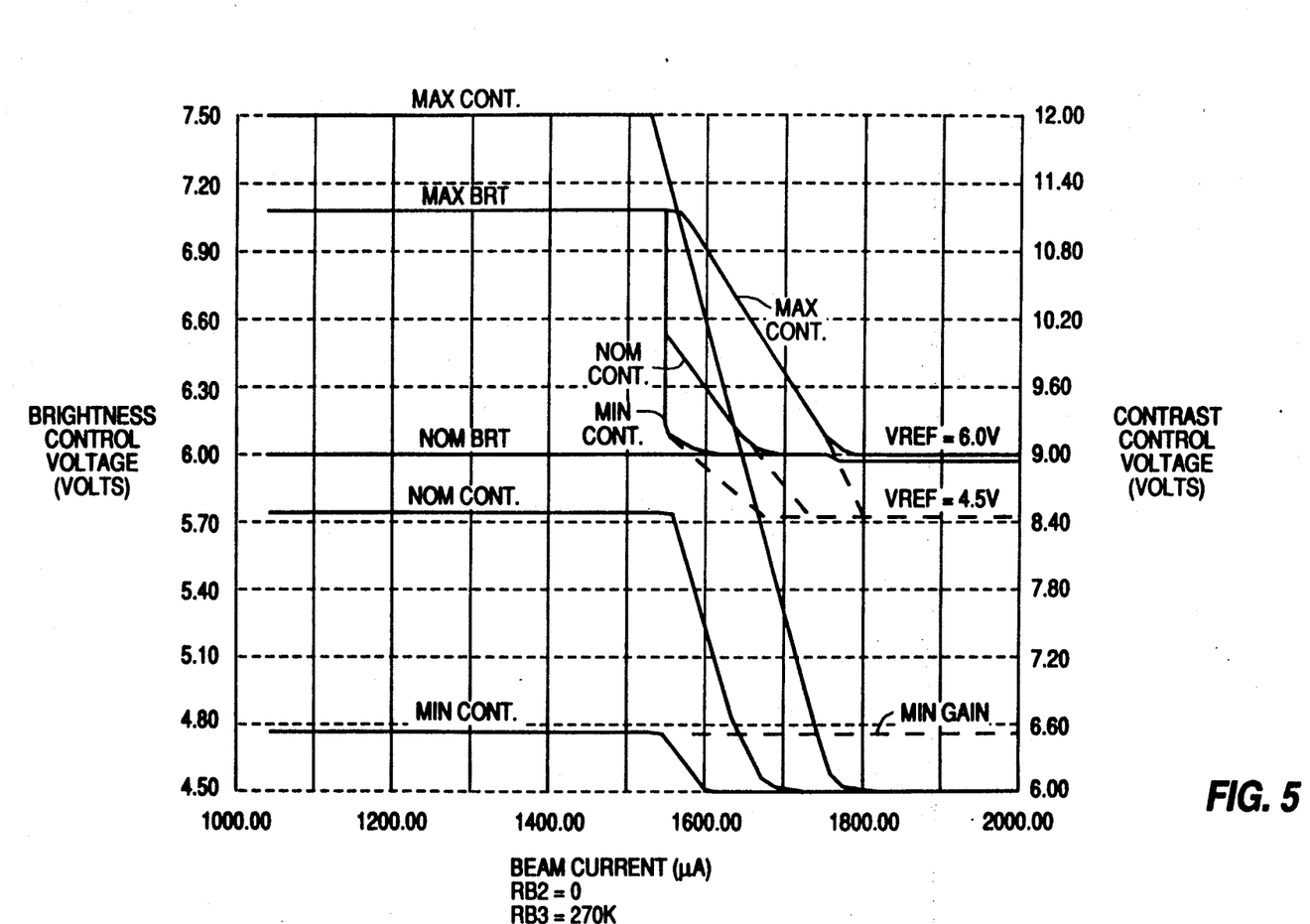

FIGS. 2-5 indicate the effect of changing the values of resistors RB2 and RB3 of brightness DAC 15 on the brightness control characteristic. The ratio of resistors RB2 and RB3 determines the point at which brightness beam current limiting begins relative to the user contrast control setting. FIG. 2 (RB2=270K, RB3=0) indicates that brightness beam current limiting does not occur until contrast beam current limiting is at or near maximum. FIG. 5 (RB2=0, RB3=270K) indicates that brightness beam current limiting begins at approximately the same level of beam current as contrast beam current limiting. As is indicated in FIGS. 3 and 4, intermediate ratios of the values of resistors RB2 and RB3 will cause the point at which brightness beam current limiting begins to change between the points indicated in FIGS. 2 and 5. Changing the values of resistors RB2 and RB3 does not significantly affect the contrast control characteristic. It is also noted that while the user contrast control setting affects the starting point of brightness beam current limiting, the user brightness control setting does not affect the contrast control characteristic.

FIGS. 2-5 also indicate, with dashed lines, the effect of changing reference voltage VREF on the brightness control characteristic. The magnitude of reference voltage VREF, in conjunction with the values of resistors RB3, RB4 and RB5, determines the minimum brightness beam current limiting control voltage. It is noted however that the brightness beam current control voltage does not fall below the nominal brightness control voltage until the entire contrast beam current limiting control voltage range has been exhausted and the contrast beam current limiting control voltage is at its minimum value. Such reductions in brightness are emergency provisions provided to account for abnormal operating conditions, e.g., due to the misadjustment of the screen voltages for picture tube 3.

It is noted that if the value of reference voltage VREF is changed and it is desired to maintain the same beam current limiting threshold, it is necessary to change the value of resistor RS. Since the value of resistor RS is one of the the terms which determine the beam current limiting loop gain, if the value of resistor is changed, and it is desired to maintain the same loop gain, the value of resistor RG must also be changed.

Figure 6:
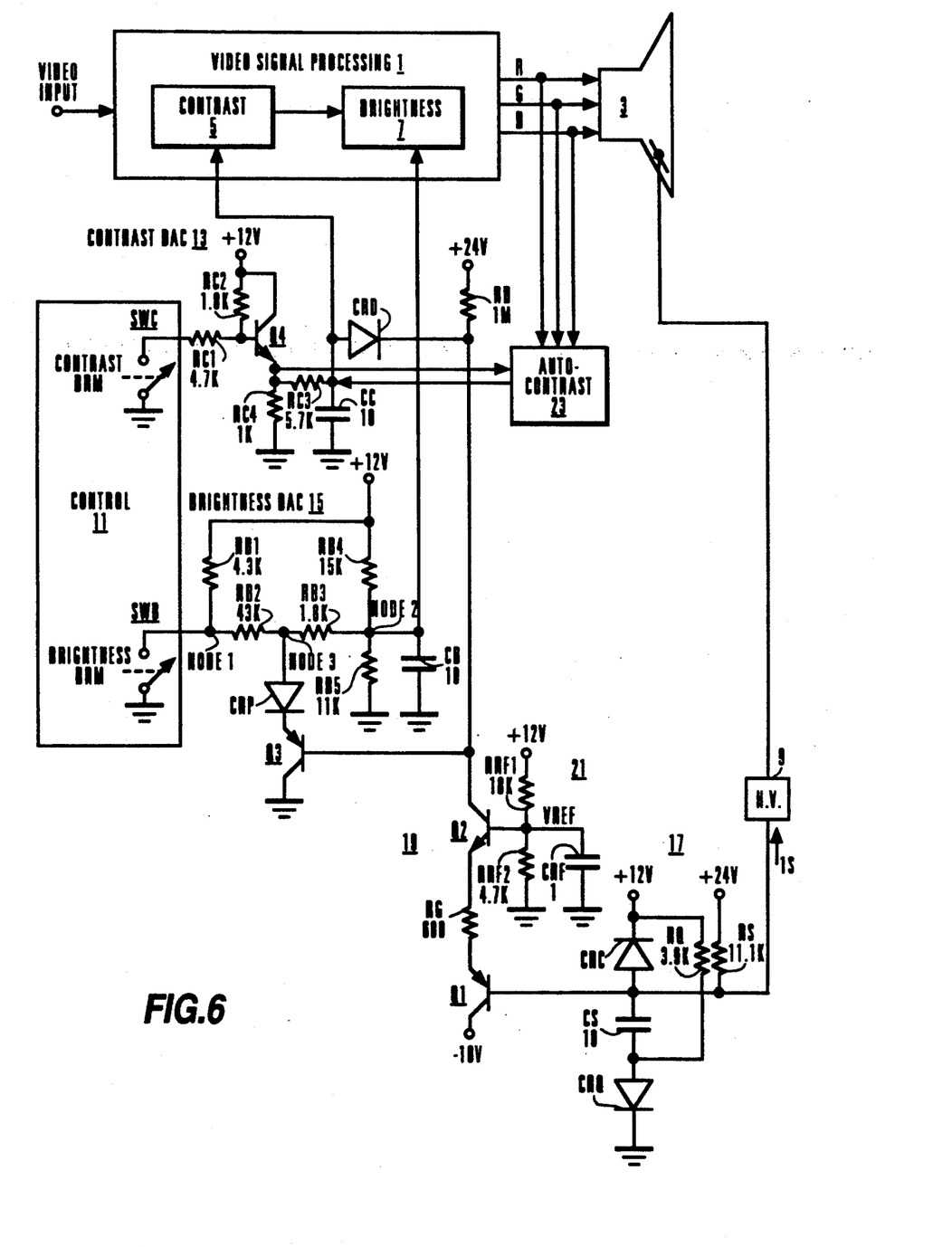
FIG. 6 shows, partially in block diagram form and partially in schematic diagram form, a modified form of the television system shown in FIG. 1.

It will be appreciated by those skilled in the art that modifications to the preferred embodiment can be made to suit particular needs. For example, the beam limiter arrangement show in FIG. 6 is similar in configuration to the one shown in FIG. 1, but component values have been changed to suit a television system with higher average beam current requiring a higher beam current limiting threshold (e.g., 2050 microamperes) and a different brightness control voltage range (e.g., 5.2 v±0.7 v). A protection diode CRP has been added between the emitter of transistor Q3 and the junction of resistors RB2 and RB3 (node 3) to prevent the reverse breakdown of transistor Q3.

The beam limiter arrangement shown in FIG. 6 is also different from the one shown in FIG. 1 in other respects. Specifically, an automatic contrast unit 23 has been added. Automatic contrast control unit 23 is responsive to the white-going peaks of a signal corresponding to the luminance component of reproduce images and reduces the contrast control voltage developed across filter capacitor CC if white-going peaks exceed a predetermined threshold. As is indicated in FIG. 6, automatic contrast control unit 23 may be responsive to a combination (e.g., sum) of the R, G and B signals coupled to picture tube 23. Such an automatic contrast control arrangement is described in detail in U.S. Pat. No. 4,980,756, entitled "Control Signal Generator for a Television System", issued on Dec. 25, 1990 to W. A. Lagoni. Automatic contrast control unit 23 is also responsive to the user contrast setting in order to defeat the automatic white-peak limiting operation should the user contrast setting be at its maximum value. The latter indicates that the user is more interested in obtaining images with maximum peak-white portions than in preventing spot defocussing. To defeat the automatic white-peak limiting operation, automatic control unit 23 includes an auxiliary low pass filter (not shown) for sensing the user contrast control setting and a switching arrangement (not shown) for decoupling the output of automatic contrast control unit 23 from filter capacitor CC when the user contrast control setting is at its maximum level. Such an arrangement is described in detail in U.S. patent application Ser. No. 751,810, entitled "Video Signal System Including Apparatus For Deactivating An Automatic Control Arrangement, filed on Aug. 30, 1991 for W. A. Lagoni and R. L. O'Brien. To accommodate the auxiliary low pass filter of the automatic contrast defeating portion of automatic contrast unit 23, an emitter-follower, including an NPN transistor Q4 and a emitter load resistor RC4, has been added to contrast DAC 13 between the junction of resistors RC1 and RC2 and the low pass filter comprising resistor RC3 and filter capacitor CC.

While the invention has been described with reference to a direct view television system in which the reproduced images are displayed directly on the screen of a single picture tube, it may also be used to control the beam currents of the individual red, green and blue picture tubes of a projection television system. For example, the arrangement shown in FIG. 6 can be used in a projection television system requiring a beam current limiting threshold of 1650 microamperes by simply changing the value of resistor RS from 11.1 kilohms to 13.7 kilohms.

Still other modifications may become apparent to those skilled in the art. These and other modifications are intended to be within the scope of the invention defined by the following claims.

I claim:

1. In a television system including a picture tube and a video signal processing channel, having image contrast and brightness sections, for supplying a processed video signal to said picture tube, and user responsive contrast and brightness control units for generating respective user contrast and brightness control signals, a beam current limiting arrangement comprising:

means for sensing the beam current drawn by said picture tube;

means for generating a contrast beam current control signal for reducing the image contrast when the sensed beam current exceeds a first threshold value;

means coupled to said user responsive brightness control unit for comparing the level of said user contrast control signal to a nominal brightness control level corresponding to a nominal image brightness level; and means coupled to said comparing means for generating a brightness beam current control signal for reducing the image brightness when (1) the sensed beam current exceeds a second threshold, and (2) if the user brightness control level exceeds the nominal user brightness control level.

2. The beam current limiting arrangement defined in claim 1 wherein:

said brightness beam current control signal generating means only reduces the image brightness when the contrast control signal reaches its minimum value.

3. The beam current limiting arrangement defined in claim 1, wherein:

said brightness beam current control signal generating means reduces the image brightness only until the image brightness is at least approximately at its nominal level.

4. The beam current limiting arrangement defined in claim 1, wherein:

said brightness beam current control signal generating means is responsive to said contrast beam current control signal.

5. The beam current limiting arrangement defined in claim 4, wherein:

said first threshold is fixed.

6. The beam current limiting arrangement defined in claim 1, wherein:

said user responsive brightness control unit comprises a source of an encoded pulse signal, and a filter for filtering said pulse signal to genrate a user responsive control voltage; and said comparing means includes first and second resistance elements coupled in series between said pulse signal source and a source of a voltage corresponding to the nominal image brightness level, and a threshold device responsive to the sensed beam current and coupled to a junction between said first and second resistance elements.

7. The beam current limiting arrangement defined in claim 6, wherein:

said contrast beam current control signal generating means comprises a transistor having first and second electrodes defining a conduction channel and a control electrode for controlling the conduction of said conduction channel;

said beam current sensing means is coupled to said first electrode of said transistor;

a source of a reference voltage corresponding to said first threshold is coupled to said control electrode of said transistor; and said threshold device of said comparing means is coupled to said second electrode of said transistor.

8. The beam current limiting arrangement defined in claim 7, wherein:

said reference voltage also corresponds to the nominal image brightness level.

9. A television system comprising:

a picture tube;

a video signal processing channel including image contrast and brightness sections for supplying a processed video signal to said picture tube;

a user responsive contrast control unit for controlling said contrast section of said video signal processing channel in accordance with a user contrast setting;

a user responsive brightness control unit for controlling said brightness section of said video signal processing channel in accordance with a user brightness setting;

sensing means for sensing the beam current drawn by said picture tube; and beam current limiting means coupled to said sensing means and to said contrast and brightness control units for reducing the image contrast when the sensed beam current exceeds a first threshold value, and for reducing the image brightness when (1) the sensed beam current exceeds a second threshold, and (2) if the user brightness setting corresponds to an image brightness level greater than a midrange image brightness level.

10. The television system defined in claim 9, wherein: said first and second thresholds are equal.

11. The television system defined in claim 9, wherein: said beam current limiting means reduces the image brightness only until the image brightness is at least approximately at the midrange brightness level.

* * * * *